Figure 3:
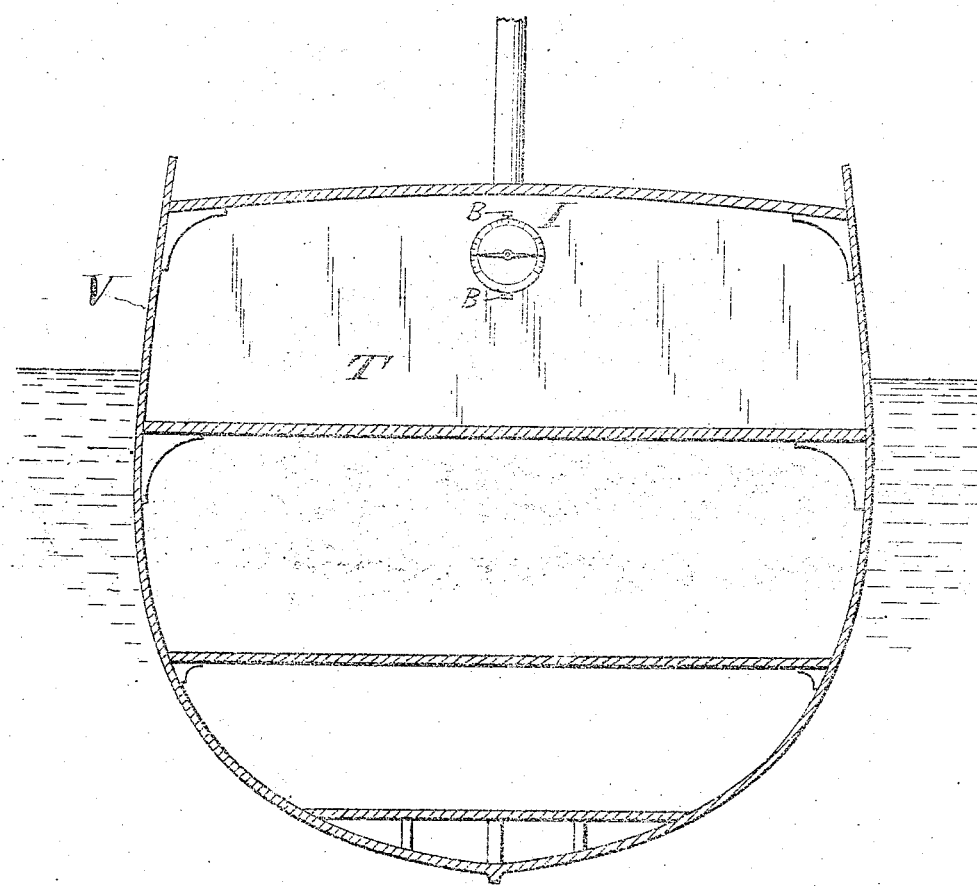

No. 683,788. Patented Oct. 1, 1901.
W. F. C. NINDEMANN.
INDICATOR FOR THE PITCH AND ROLL OF VESSELS.
(Application filed Dec. 17, 1900.)
(No Model.) 2 Sheets—Sheet 1.
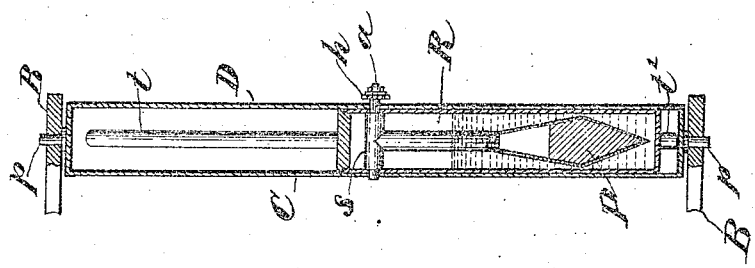
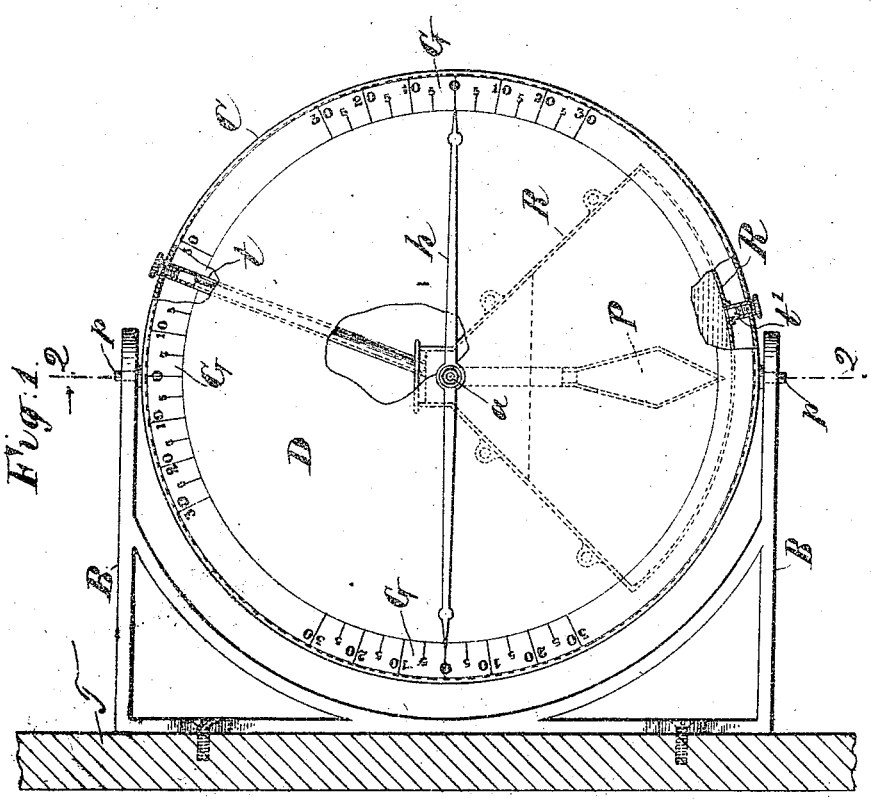
WITNESSES: INVENTOR
William F. C. Nindemann
BY
ATTORNEY No. 683,788.  
W. F. C. HINDEMANN.  
INDICATOR FOR THE PITCH AND ROLL OF VESSELS.  
(Application filed Dec. 17, 1900.)  
Patented Oct. 1, 1901.

(No Model.)   2 Sheets—Sheet 2.

WITNESSES:

INVENTOR  
William F. C. Hindemann  
BY  
ATTORNEY

UNITED STATES PATENT OFFICE.

WILLIAM F. C. NINDEMANN, OF NEW YORK, N. Y.

INDICATOR FOR THE PITCH AND ROLL OF VESSELS.

SPECIFICATION forming part of Letters Patent No. 683,788, dated October 1, 1901.

Application filed December 17, 1900. Serial No. 40,118. (No model.)

*To all whom it may concern:*

Be it known that I, WILLIAM F. C. NINDEMANN, a citizen of the United States, residing in the city of New York, borough of Brooklyn, in the county of Kings and State of New York, have invented certain new and useful Improvements in Indicators for the Pitch and Roll of Vessels, of which the following is a specification.

This invention relates to the class of pendulum devices for indicating the degree of inclination of a vessel when it pitches or rolls; and the object is, in part, to provide a simple device which will indicate both the pitch, or longitudinal inclination, and the roll, or lateral inclination, and in part to provide a simple means for steadying the pendulum in its movement, so that it may not shift too suddenly or vibrate too easily.

In the accompanying drawings, which serve to illustrate an embodiment of the invention, Figure 1 is a face view of the indicator, partly broken away to show the interior. Fig. 2 is a transverse vertical section at line 2 in Fig. 1; and Fig. 3 is a cross-section, on a relatively small scale, of a vessel provided with the indicator.

The indicator comprises a dial-casing C, which may be conveniently of circular form, although this is not essential. On the dial-face D of the casing are marked graduations G, indicating degrees, and on an arbor $a$, extending through the casing, is secured a hand $h$. On the arbor $a$, within the casing, is secured a pendulum P. (Seen only in dotted lines in Fig. 1.) The casing has pivots $p$ at top and bottom, whereby it is mounted in a suitable bracket B, so that the casing may be turned with the hand $h$ extending fore and aft or athwartships, and thus indicate either the pitch or roll of the vessel. In mounting the indicator in the vessel a line passing through the two pivots $p$ must be perpendicular with the water-line plane, and then the hand $h$ will point to zero on the graduations G when the vessel is on an "even keel." The graduations should number from zero in both directions, as shown, and preferably there will be a series of graduations at opposite edges of the dial, the hand extending across from one set to the other; but this is only a convenience, so that the degree of inclination may be read from either end of the hand. For ordinary vessels there may be also a set of graduations at the top of the dial, when the hand can be set at right angles to the position shown in Fig. 1; but for submarine boats the arrangement of the hand as shown in Fig. 1 is preferred.

In order to steady the pendulum in its movements and prevent it from vibrating too easily, there is a receptacle R mounted in the casing C, in which receptacle the pendulum hangs, and this receptacle contains alcohol, in which the pendulum is submerged. As the latter (see Fig. 2) is nearly as wide as the receptacle, the liquid will check vibrations of the pendulum and steady it in its movements. The receptacle R is charged with alcohol at a filling-tube $t$ and may be drawn off at an outlet-tube $t'$.

In order that the pendulum may swing freely, even when the instrument is inclined, the stem of the pendulum is provided with a sleeve $s$, which embraces and is secured to the arbor $a$ and fits snugly endwise in the receptacle R.

Alcohol is used by preference in the receptacle R, but any liquid may as well be employed. Alcohol will not freeze, but other liquids or mixtures of liquids will also stand low temperatures without freezing.

In Fig. 3 the indicator is represented (I in this figure) as mounted in a vessel V on a transverse bulkhead T, also seen in Fig. 1. The bracket B may be secured to this bulkhead or partition by screws or other means.

Having thus described my invention, I claim—

1. An indicator for the pitch and roll of a vessel, comprising a bracket to be mounted in the vessel and having two projecting arms, a dial and its casing pivotally mounted at top and bottom in the arms of said bracket so that its pivotal axis may be vertical when the vessel is on an even keel, an arbor in said casing, the hand thereon adapted to traverse graduations on the dial, a receptacle for liquid in said casing, and the pendulum fixed to the arbor and suspended in said receptacle, substantially as set forth.

2. The combination with a vessel, of an indicator for the pitch and roll of the vessel, said indicator comprising a dial-casing pivotally mounted in the vessel with its pivotal axis vertical when the vessel is on an even keel, the arbor in said casing, the hand thereon, the receptacle for liquid in said casing, and the pendulum fixed to the arbor and suspended in the said receptacle, substantially as set forth.

3. The combination with a vessel, and a supporting-bracket B, mounted therein, of the casing C, pivotally mounted at its top and bottom only in said bracket and having a dial with degree-graduations thereon, an arbor $a$ in the casing, a hand $h$ on said arbor, a receptacle R for liquid, and a pendulum secured to said arbor and pendent in said receptacle, substantially as set forth.

In witness whereof I have hereunto signed my name, this 14th day of December, 1900, in the presence of two subscribing witnesses.

WILLIAM F. C. NINDEMANN.

Witnesses:
HENRY CONNETT,
PETER A. ROSS.